May 13, 1952  G. C. LUEBKEMAN  2,596,573
MOLDING PROCESS
Filed Feb. 23, 1950
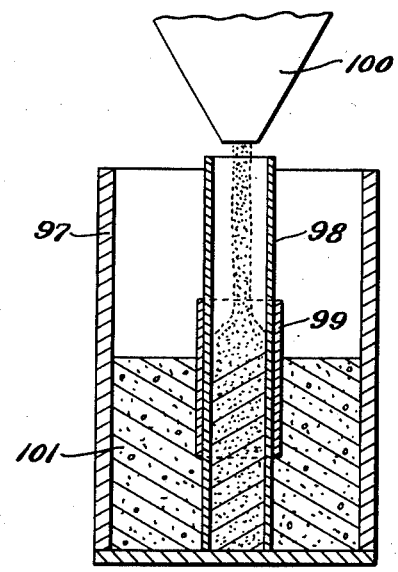
INVENTOR.
George C. Luebkeman
BY
Murray, Sackhoff & Murray
ATT'YS Patented May 13, 1952

2,596,573

UNITED STATES PATENT OFFICE 2,596,573

MOLDING PROCESS

George C. Luebkeman, Cincinnati, Ohio

Application February 23, 1950, Serial No. 145,743

2 Claims. (Cl. 18—58)

This application is a continuation in part of my co-pending application for molding processes and means, Serial No. 552,181, filed August 31, 1944, now U. S. Patent No. 2,517,902 dated August 8, 1950.

This invention has to do with the making of temporary shapes and is particularly concerned with the formation of molds and cores used in the molding processes, such as plastics and cast materials.

An object of the invention is to provide a mold, shape, or core formed of powdered or granular material covered by or embraced in pliable covering or containing means, and means for applying external pressure upon the body of granular material for causing the latter to become substantially rigid during the time that the mold or core is in use.

Another object is to provide a molding means and process of the kind indicated in which differential pressures are applied to the inside and outside of the formed core for giving added strength and rigidity to the same whereby the core is enabled to withstand considerable pressures imposed thereon by the material being molded, without undergoing any modification of shape.

It is a further object to accomplish these various processes and means through expedients simple in structure and operation.

These and other objects are attained by the means described herein and illustrated in the accompanying drawing in which:

The figure in the drawing is a cross sectional view illustrating a form of the invention and its use.

One of the great problems in molding is the formation and positioning of cores or molds and the removal thereof after the molding operations. Various expedients have been utilized heretofore and have been found generally difficult and undesirable in use as entailing injury either to the formed objects or the forming apparatus.

These and many other difficulties well-known to those skilled in the art, have been obviated by the present invention which might be termed a "soft core" method and which comprises the use of pliable covers or containers for a granular mass which is shaped in the desired form and temporarily, for the necessary length of time, rigidified or solidified in this form by the use of external pressure applied thereto.

The figure in the drawing corresponds to Fig. 14 of my aforementioned co-pending application Serial No. 552,181 now U. S. Patent No. 2,517,902, and the reference characters are unchanged in the description of the invention herein claimed. The invention in the illustrated form is useful in the formation of hollow molded construction. The equipment may comprise a mold 97 having positioned therein a tube 98 or other shape of paper or other non-rigid material, having a shaper 99 of similar form disposed thereabout. At the beginning of the process, the shaper 99 is disposed around the lower end portions of the tube 98, as seen in Fig. 14, sand or other granular material is directed from a suitable supply 100 into the tube, and concrete or other molding material 101 is placed in the mold 97 around the shaper 99. The latter is gradually withdrawn, as indicated in the figure, from those portions of the tube 98 in which the level of granular material is substantially above the level of the concrete. In such portions of the tube 98, the sand has become solidly positioned and the granules thereof are locked by the force of the surrounding concrete. After completion of the progressive process described, and hardening of the concrete, the core of sand may be poured out.

The process may include the use of several shapers of desired cross section in a mold 97 of greater cross section. The height or length of mold 97 is subject to variation as are all other dimensions in order to accommodate the particular finished product desired.

The tube 98 fits the cross section of the shaper 99 and is retained in that shape by the granular material from the supply such as 100 and said tube may be allowed to remain in the finished construction as a smooth liner for the cored passage in the concrete or other material 101 after setting and hardening. Should the finished product be satisfactory with a rough inside wall face for the cored passage, the shaper 99 may be employed without the tube 98 but otherwise in the identical manner described.

While the operating steps have been illustrated as a progressive or continuous molding in a vertical direction, it is to be understood that the angle may be altered to suit the conditions of the particular size and nature of the work so long as the level of the granular material is maintained above and in advance of the building up of the plastic 101 around the shaper 99 and so that the bottom or trailing end of the shaper is not completely withdrawn from the plastic 101 while the progressive molding continues. The progressive or continuous molding process of the invention may be employed with plastic cementitious materials of accelerated or delayed setting

What is claimed is:

1. The process of continuous hollow molding which comprises placing a hollow shaper about an elongated hollow flexible body conformable to the interior thereof, flowing granular material into said hollow body substantially to the top of said shaper, flowing plastic molding material into the mold around the shaper and progressively withdrawing the shaper along the filled portions of elongated hollow body and at the same time progressively maintaining the relative levels of the granular material and the plastic molding material while maintaining the lower end of the shaper at a predetermined distance below the top level of the plastic molding material.

2. The process of hollow molding which comprises surrounding a hollow flexible member with a hollow shaper and filling the said member progressively with granular material to form a soft core shaped like the inside of the shaper, flowing plastic material around the shaper to a longitudinally lesser extent than the granular filling inside, progressively shifting the shaper out of the previously cast plastic and subjecting the filled member to the pressure of the cast plastic at the end of the shaper before the plastic is set.

GEORGE C. LUEBKEMAN.

REFERENCES CITED

The following references are of record in the file of this patent:

UNITED STATES PATENTS

| Number | Name | Date |
| --- | --- | --- |
| 699,588 | Stevens | May 6, 1902 |
| 965,150 | Atterbury | July 26, 1910 |
| 1,171,579 | Atterbury | Feb. 15, 1916 |
| 1,712,442 | Frink | July 16, 1929 |